United States Patent Office 3,816,397
Patented June 11, 1974

3,816,397
11,12-EPOXYERYTHROMYCINS

John Soloman Tadanier, Chicago, and Jerry Roy Martin, Waukegan, Ill., assignors to Abbott Laboratories, Chicago, Ill.
No Drawing. Filed June 15, 1972, Ser. No. 263,056
Int. Cl. C07c 129/18
U.S. Cl. 260—210 E          3 Claims

ABSTRACT OF THE DISCLOSURE

Covers 11,12-epoxyerythromycins which are useful as antibiotics.

DESCRIPTION OF THE INVENTION

This invention relates to 11,12-epoxyerythromycins which possess antibiotic activity.

Erythromycin is produced in two forms denoted A and B by cultivating a strain of *Streptomyces erythreus* in a suitable nutrient medium as is taught in U.S. 2,653,899, Bunch et al. The structure of erythromycin is represened by the following formula:

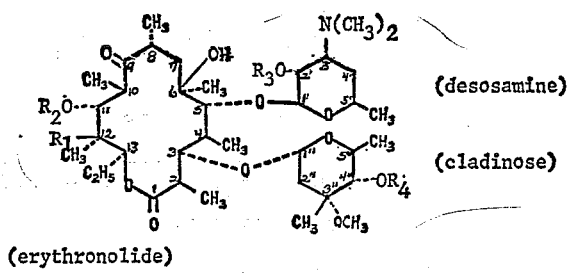

(erythronolide)

In this formula, when $R_2$, $R_3$ and $R_4$ represent hydrogen and $R_1$ represents hydroxyl, the structure illustrated is erythromycin A. When $R_1$ is, however, also hydrogen, the structure of erythromycin B is illustrated. The term "erythromycin" when used herein without modification is meant to embrace both forms, that is, erythromycin A and erythromycin B.

Erythromycin, as will be noted from the formula, comprises three cyclic fragments. These fragments are referred to respectively as cladinose, desosamine and erythronolide. The positions on the cladinose ring are indicated by double primed numbers; the positions on the desosamine ring by single primed numbers; while positions on the erythronolide ring are indicated by unprimed numbers.

The first step in producing the compounds here is to provide a 11-O-methanesulfonylerythromycin A or enol ether thereof. This is prepared according to the techniques outlined in co-pending, commonly assigned application, filed as of even date, bearing Ser. No. 263,087. To prepare 11, 12-epoxyerythromycin A 11–O-methaneulfonyl A derivative is treated with 1,5-diazabicyclo[5.4.0]undecene-5 in an inert solvent such as xylene, methylene chloride, or another inert hydrocarbon, toluene, or benzene at low temperature, say 0–5° C. to prepare the enol ether of the above the reaction is carried out at reflux temperature for 12–24 hours.

Another way of obtaining the 11,12-epoxyerythromycin is to treat the erythromycin A enol ether with aqueous acetic acid. Normally the amount of acid in proportion to water is 30–60% acid based on the total volume of water and acid. In a typical case a 1:1 volume of glacial acetic to water is used.

The following examples illustrate preparation of the compounds of the invention.

EXAMPLE 1

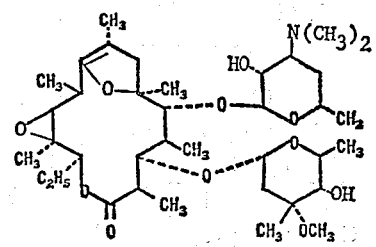

11,12-epoxyerythromycin A enol ether

A solution prepared from 2.2 g. of 11-O-methanesulfonylerythromycin A enol ether, 3.0 g. of 1,5-diazabicyclo [5.4.0]undecene-5, and 36 ml. of benzene was heated under reflux for 18 hours. The product (1.74 g. of a white glass) was isolated by benzene extraction. Partition column chromatography of 1.1 g. gave 834 mg. of pure 11, 12-epoxyerythromycin A enol ether as a white glass $[\alpha]_D^{26}$ —42°; IR: 3590 (shoulder), 3550, 3500–3400, 1727 cm.$^{-1}$; NMR: $\delta$ 3.28 (OCH$_3$);

2.66 ($J_{10,11}$=6.2 Hz. $C_{11}$-H), 2.28 (NMe$_2$), 1.62 ($C_8$-CH$_3$), 1.39 ($C_6$-CH$_3$).
Anal. Calcd. for $C_{37}H_{63}O_{11}N$: C, 63.68; H, 9.10; N, 2.01. Found: C, 63.81; H, 9.14; N, 1.90.

EXAMPLE 2

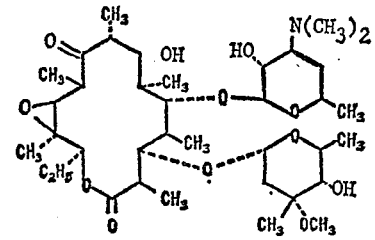

11,12-epoxyerythromycin A

A solution prepared from 15.8 g. of 11-O-methanesulfonyl-2'-O-acetyl-4''-O - formylerythromycin A, prepared as described in Example 1, 6.8 g. of 1,5-diazabicyclo [5.4.0]undecene-5 and 90 ml. of benzene was stirred at 50° C. for 18 hours. Benzene (98 ml.) and water (98 ml.) were added and the resulting mixture was stirred at room temperature for 1 hour.

The resulting mixture was shaken with a mixture of 500 ml. of benzene and 800 ml. of 5% NaHCO$_3$. The aqueous phase was separated and extracted with 700 ml. of benzene. The benzene solutions were washed in series with three 600-ml. portions of water, combined, and dried over anhydrous magnesium sulfate. Evaporation of the benzene under reduced pressure left 12.9 g. of 2'-O-acetyl-4''-O-formyl-11,12-epoxyerythromycin A.

A solution prepared from 4.0 g. of 2'-O-acetyl-4''-O-formyl-11,12-epoxyerythromycin A, prepared as described above, 9 ml. of 5% aqueous NaHCO$_3$, and 88 ml. of methanol was stirred at room temperature for 48 hours. The resulting solution was shaken with a mixture of 600 ml. of chloroform and 600 ml. of 5% NaHCO$_3$. The chloroform solution was washed with three 600 ml. portions of water. Evaporation of the chloroform under reduced pressure left 3.58 g. of an orange oil. Partition column chromatography of 3.5 g. of this material yielded 1.5 g. of pure 11,12-epoxyerythromycin A, and as amorphous white glass composed of a 1.2 to 1 mixture of tautomeric forms: 11,12-epoxyerythromycin A (a) and 11,12-epoxyerythromycin A 6,9-hemiacetal (b). Crystallization from ether gave the pure crystalline 11,12-epoxyerythromycin A 6,9-hemiacetal (b), M.P. 158–162°, $[\alpha]_D^{24}$ —90°, IR: 3578, 3500–3400, 1727 cm.$^{-1}$; NMR: δ 3.36 (OCH$_3$), 2.63 (J$_{10, 11}$=10.0 Hz., C$_{11}$-H), 2.29 (NMe$_2$), 1.66 (C$_6$-CH$_3$).

Anal. Calcd. for C$_{37}$H$_{65}$NO$_{12}$: C, 62.08; H, 9.15; N, 1.96. Found: C, 62.14; H, 9.34; N, 1.77.

EXAMPLE 3

11,12-epoxyerythromycin A

A solution prepared from 612 mg. of 11,12-epoxyerythromycin A enol ether, prepared by the method of Example 1, 9.6 ml. of glacial acetic acid and 9.6 ml. of water was allowed to stand at room temperature for 0.5 hours. The resulting solution was then added dropwise, over a period of 10 minutes to a stirred suspension of 30 g. of solid NaHCO$_3$ in 300 ml. of water. The aqueous solution was extracted with 200 ml. of chloroform, and the chloroform solution was washed with two 150-ml. portions of water. Evaporation of the chloroform left 641 mg. of white glass. Partition column chromatography gave 297 mg. of pure 11,12-epoxyerythromycin A, identical with that prepared by the method of Example 1.

A representative compound was then tested for its activity against gram positive and gram negative bacteria in an agar dilution test. Results are given in agar dilution units. These may be converted to MIC values (minimum inhibitory concentrations) expressed in micrograms/ml. by merely dividing the agar dilution units into the concentration and multiplying by the proper factor. Thus, for example, if one tested a sample at a concentration of 4 mg./ml., and determined it had an activity of 10 agar dilution units, in order to determine the MIC value in micrograms/ml. one must divide the concentrations of 4 by the number of agar dilution units, here 10, and multiply by 1000.

The compound here was tested as to its activity against the following organisms:

ECR$_3$=Multiple drug resistant *Escherichia coli*
SF=*Streptococcus faecalis* ATCC 10541
PA=*Pseudomonas aeruginosa* BMH #1
SA=*Staphylococcus aureus* ATCC 6438P
EC=*Escherichia coli* ATCC 26
BS=*Bacillus subtilis* #10707 (University of Ill.)
PV=*Proteus vulgaris* ATCC 6897
SS=*Shigella sonnei* ATCC 9290
ST=*Salmonella typhosa* ATCC 9992
KP=*Klebsiella pneumoniae* ATCC 10031.

Results are as follows:

TABLE I

|  | ECR$^3$ | SF | PA | SA | EC | BS | PV | SS | ST | KP |
|---|---|---|---|---|---|---|---|---|---|---|
| Example I, 1 mg./ml | 0 | 320 | 0 | 40 | 0 | 160 | 0 |  |  | 40 |
|  | 10 |  |  | 160 | 160 | 160 | 160 | 160 | 160 | 80 |

What is claimed is:
1. An erythromycin derivative selected from the group consisting of 11,12-epoxyerythromycin A 6,9 enol ether and 11,12-epoxyerythromycin A.
2. The derivative of claim 1 which is 11,12-epoxyerythromycin A 6,9 enol ether.
3. The derivative of claim 1 which is 11,12-epoxyerythromycin A.

References Cited
UNITED STATES PATENTS
3,674,773  7/1972  Kurath _____ 260—210 E
3,681,323  8/1972  Kurath et al. _____ 260—210 E OTHER REFERENCES
"Chem. Abst." vol. 75, 1971, p. 1434s.

JOHNNIE R. BROWN, Primary Examiner

C. B. OWENS, Assistant Examiner

U.S. Cl. X.R.
424—181